(12) United States Patent
Katz et al.

(10) Patent No.: US 8,218,445 B2
(45) Date of Patent: Jul. 10, 2012

(54) SMART ETHERNET EDGE NETWORKING SYSTEM

(75) Inventors: Fabio Katz, Kanata (CA); Pablo Frank, Ottawa (CA); Brian Smith, Ottawa (CA)

(73) Assignee: Ciena Corporation, Linthicum, MD (US)

(*) Notice: Subject to any disclaimer, the term of this patent is extended or adjusted under 35 U.S.C. 154(b) by 1142 days.

(21) Appl. No.: 11/446,316

(22) Filed: Jun. 2, 2006

(65) Prior Publication Data

US 2007/0280117 A1    Dec. 6, 2007

(51) Int. Cl.
 H04L 12/28    (2006.01)
(52) U.S. Cl. ......... 370/238; 370/351; 709/241; 709/244
(58) Field of Classification Search .................. 370/351, 370/409, 238, 254, 356, 352; 706/19; 709/238–242
See application file for complete search history.

(56) References Cited

U.S. PATENT DOCUMENTS

| | | | |
|---|---|---|---|
| 5,859,837 A |  | 1/1999 | Crayford |
| 6,026,077 A | * | 2/2000 | Iwata ............................ 370/254 |
| 6,134,589 A | * | 10/2000 | Hultgren ....................... 709/227 |
| 6,195,553 B1 | * | 2/2001 | Claffery et al. ............... 455/445 |
| 6,301,244 B1 | * | 10/2001 | Huang et al. .................. 370/351 |
| 6,339,587 B1 | * | 1/2002 | Mishra .......................... 370/255 |
| 6,564,258 B1 | * | 5/2003 | Uniacke ........................ 709/223 |
| 6,904,286 B1 |  | 6/2005 | Dantu |
| 7,020,086 B2 | * | 3/2006 | Juttner et al. ................. 370/238 |
| 7,035,259 B2 | * | 4/2006 | Nomura et al. ............... 370/392 |
| 7,047,316 B2 | * | 5/2006 | Iwata et al. ................... 709/240 |
| 7,092,378 B1 | * | 8/2006 | O'Neil ........................... 370/351 |
| 7,146,000 B2 | * | 12/2006 | Hollman et al. ......... 379/221.06 |
| 7,154,625 B2 | * | 12/2006 | El-Gazzar et al. ........... 358/1.15 |
| 7,171,306 B2 | * | 1/2007 | Hirose .......................... 701/209 |
| 7,376,749 B2 | * | 5/2008 | Loach et al. .................. 709/238 |
| 7,406,032 B2 | * | 7/2008 | Li et al. ......................... 370/217 |
| 7,546,362 B2 | * | 6/2009 | Kroger et al. ................. 709/223 |
| 7,603,481 B2 | * | 10/2009 | Carter ........................... 709/240 |
| 7,813,870 B2 | * | 10/2010 | Downs et al. ................. 701/117 |
| 2002/0150041 A1 | * | 10/2002 | Reinshmidt et al. .......... 370/216 |
| 2002/0181396 A1 |  | 12/2002 | Chen et al. |

(Continued)

FOREIGN PATENT DOCUMENTS

EP    1124356 A2    8/2001

(Continued)

*Primary Examiner* — Hassan Kizou
*Assistant Examiner* — Roberta A Shand
(74) *Attorney, Agent, or Firm* — Clements Bernard PLLC; Christopher L. Bernard; Lawrence A. Baratta, Jr.

(57) ABSTRACT

A system is provided for selecting connection paths in a telecommunications network having a multiplicity of nodes interconnected by a multiplicity of links. The system identifies multiple constraints for connection paths through the network between source and destination nodes, and identifies paths that satisfy all of the constraints for a connection path between a selected source node and a selected destination node. A system is also provided for optimizing utilization of the resources of such a telecommunications network by establishing connection paths through the network between selected source and destination nodes, the established connection paths satisfying the constraints; for each established connection path, determining whether other connection paths exist between the selected source and destination nodes, and that satisfy the constraints; and if at least one such other connection path exists, determining whether any such other connection path is more efficient than the established connection path and, if the answer is affirmative, switching the connection from the established connection path to the most efficient other connection path.

22 Claims, 5 Drawing Sheets

U.S. PATENT DOCUMENTS

| | | |
|---|---|---|
| 2003/0058880 A1 | 3/2003 | Sarkinen et al. |
| 2003/0063560 A1 | 4/2003 | Jenq et al. |
| 2003/0095500 A1* | 5/2003 | Cao ............................ 370/216 |
| 2003/0133406 A1 | 7/2003 | Fawaz et al. |
| 2003/0147347 A1 | 8/2003 | Chen et al. |
| 2003/0156542 A1 | 8/2003 | Connor |
| 2004/0037223 A1 | 2/2004 | Harrison et al. |
| 2004/0081090 A1 | 4/2004 | Hara et al. |
| 2004/0120705 A1* | 6/2004 | Friskney et al. ................ 398/5 |
| 2004/0143560 A1* | 7/2004 | Zhu ................................ 706/19 |
| 2004/0151181 A1 | 8/2004 | Chu et al. |
| 2004/0156345 A1 | 8/2004 | Steer et al. |
| 2004/0170179 A1 | 9/2004 | Johansson et al. |
| 2004/0170186 A1 | 9/2004 | Shao et al. |
| 2004/0190447 A1* | 9/2004 | Dacosta ...................... 370/229 |
| 2004/0233850 A1* | 11/2004 | Randriamasy et al. ....... 370/238 |
| 2005/0008014 A1 | 1/2005 | Mitra et al. |
| 2005/0043884 A1* | 2/2005 | Atarashi ...................... 701/202 |
| 2005/0099943 A1* | 5/2005 | Naghian et al. .............. 370/229 |
| 2005/0141523 A1 | 6/2005 | Yeh et al. |
| 2005/0152269 A1 | 7/2005 | Liu |
| 2005/0157641 A1 | 7/2005 | Roy |
| 2005/0188108 A1* | 8/2005 | Carter et al. ................. 709/239 |
| 2005/0216477 A1* | 9/2005 | Nakadai ......................... 707/10 |
| 2005/0243711 A1 | 11/2005 | Alicherry et al. |
| 2006/0085532 A1* | 4/2006 | Chu et al. .................... 709/223 |
| 2007/0147269 A1* | 6/2007 | Ettle et al. .................... 370/254 |

FOREIGN PATENT DOCUMENTS

WO  WO 2004057817 A2  7/2004

* cited by examiner

SMART ETHERNET EDGE NETWORKING SYSTEM

FIELD OF THE INVENTION

The present invention generally relates to Ethernet access and, in particular, to bandwidth efficient Ethernet grid networking systems.

BACKGROUND OF THE INVENTION

Ethernet is rapidly becoming the protocol of choice for consumer, enterprise and carrier networks. It is expected that most networks will evolve such that Ethernet will be the technology used to transport all the multimedia applications including, for example, triple-play, Fixed-Mobile-Convergence (FMC), and IP multimedia sub-systems (IMS). Existing network elements which offer network access using Ethernet technology are not designed to make maximum use of the legacy network links existing at the edge of the carrier networks. The edge of the network is quickly becoming a bottleneck as the new applications are becoming more and more demanding for bandwidth.

Telecommunications carriers are constantly looking for new revenue sources. They need to be able to deploy rapidly a wide ranging variety of services and applications without the need to constantly modify the network infrastructure. Ethernet is a promising technology that is able to support a variety of application requiring different quality of service (QoS) from the network. The technology is now being standardized to offer different types of services which have different combinations of quality objectives, such as loss, delay and bandwidth. Bandwidth objectives are defined in terms Committed Information Rate (CIR) or Excess Information Rate (EIR). The CIR guarantees bandwidth to a connection while the EIR allows it to send at higher bandwidth when available.

In existing IP/MPLS networks, each switching element or node needs to be involved in determining the MPLS path, which requires a lot of processing power and software complexity and is operationally complex.

Most modern connection-oriented systems for packet networks use MPLS over IP networks, and connections are setup by signaling protocols such as RSVP-TE. These protocols use shortest-path algorithms combined with non-real-time information on available QoS and bandwidth resources. Each node needs to maintain forwarding tables based on control traffic sent in the network. The paths available can be constrained by pruning links not meeting the bandwidth requirements. Bandwidth is wasted because of control messaging to establish and update forwarding tables. Protocols such as OSPF, LDP and RSVP are required to set up such paths, and these control protocols consume overhead bandwidth proportional to the size of the network and the number of connections.

Pure Ethernet networks require spanning tree and broadcast messages to select a "path". Packets are broadcast over the tree while reverse learning new MAC addresses. In heavily loaded networks this function uses a lot of bandwidth to find the correct paths. To properly engineer for QoS, this type of network requires ensuring the links not in the spanning tree are assumed to be fully utilized, thus wasting additional resources.

The complexity of both Ethernet and MPLS/IP networks also affects the ability to perform network troubleshooting which increases significantly the operational costs. Routing consists of two basic tasks:

Collect/maintain state information of the network.

Search this information for a feasible, possibly optimal path.

Each link in the network is associated with multiple constraint parameters which can be classified into:

Additive: the total value of an additive constraint for an end-to-end path is given by the sum of the individual link constraint values along the path (e.g.: delay, jitter, cost).

Non-additive: the total value of a non-additive constraint for an end-to-end path is determined by the value of that constraint at the bottleneck link (e.g.: bandwidth).

Non-additive constraints can be easily dealt with using a preprocessing step by pruning all links that do not satisfy these constraints. Multiple simultaneous additive constraints are more challenging.

QoS or constraint-based routing consists of identifying a feasible route that satisfies multiple constraints (e.g.: bandwidth, delay, jitter) while simultaneously achieving efficient utilization of network resources.

Multi-constrained path selection, with or without optimization, is an NP-complete problem (e.g., cannot be exactly solved in polynomial time) and therefore computationally complex and expensive. Heuristics and approximation algorithms with polynomial-time complexities are necessary to solve the problem.

Most commonly used are shortest-path algorithms which take into account a single constraint for path computation, such as hop-count or delay. Those routing algorithms are inadequate for multimedia applications (e.g., video or voice) which require multiple constraints to guarantee QoS, such as delay, jitter and loss.

Path computation algorithms for single-metric are well known; for example, Dijkstra's algorithm is efficient in finding the optimal path that maximizes or minimizes one single metric or constraint.

However, using a single primitive parameter such as delay is not sufficient to support the different types of services offered in the network.

Sometimes a single metric is derived from multiple constraints by combining them in a formula, such as:

$$CC=BW/(D*J)$$

where CC=composite constraint, BW=bandwidth, D=delay, and J=jitter. The single metric, a composite constraint, is a combination of various single constraints. In this case, a high value of the composite constraint is achieved if there is high available bandwidth, low delay and low jitter. The selected path based on the single composite constraint most likely does not simultaneously optimize all three individual constraints (maximum bandwidth, minimal delay and loss probability), and thus QoS may not be guaranteed. Any of the constraints by itself may not even satisfy the original path requirement.

To support QoS requirements, a more complex model of the network is required that takes into account all constraints such as bandwidth, delay, delay jitter, availability and loss probability. Multiple routing metrics greatly increase the complexity of path computation. New algorithms have to be found that can compute paths that satisfy multiple constraints in practical elapsed time.

Algorithms such as spanning trees are used to prevent loops in the data path in Ethernet networks because of their connectionless nature and the absence of a Time-To-Live (TTL) attribute, which can create infinite paths Such algorithms proactively remove links from being considered in a path in order to prevent loops. This artifact of the connectionless routing scheme is costly as it prevents the use of expensive links, which remain underutilized.

On top of the above issues, business policies, such as overbooking per QoS, are ignored by the algorithms establishing the paths. These business policies are important to controlling the cost of network operations. Because of these complexity issues, it is difficult for a carrier to deploy cost-efficiently QoS-based services in the metropolitan and access networks where bandwidth resources are restricted. In the core networks, where more bandwidth is available, the bandwidth is over-engineered to ensure that all the QoS objectives can be met.

With an offline traffic engineering system, the state of all existing connection requests and the utilization of all network links are known before the new requested paths are computed. Using topology information, such as link capacities and a traffic demand matrix, a centralized server performs global optimization algorithms to determine the path for each connection request. Once a path design is completed, the connections are generally set up by a network management system. It is well known that an offline system with global optimization can achieve considerable improvement in resource utilization over an online system, if the traffic matrix accurately reflects the current load the network is carrying.

Existing traffic engineering systems do not keep in sync with the actual network or maintain real-time information on the bandwidth consumed while the network changes due to link failures, variations in the traffic generated by the applications, and unplanned link changes. The existing traffic engineering systems also do not take into account business policies such as limiting how much high priority traffic is going on a link.

SUMMARY OF THE INVENTION

In one embodiment of the present invention, a system is provided for selecting connection paths in a telecommunications network having a multiplicity of nodes interconnected by a multiplicity of links. The system identifies multiple constraints for connection paths through the network between source and destination nodes, and identifies paths that satisfy all of the constraints for a connection path between a selected source node and a selected destination node. One particular implementation selects a node adjacent to the selected source node; determines whether the inclusion of a link from the source node to the adjacent node, in a potential path from the source node to the destination node, violates any of the constraints; adds to the potential path the link from the source node to the adjacent node, if all of the constraints are satisfied with that link added to the potential path; and iterates the selecting, determining and adding steps for a node adjacent to the downstream node of each successive added link, until a link to the destination node has been added.

In another embodiment of the invention, a system is provided for optimizing utilization of the resources of a telecommunications network having a multiplicity of nodes interconnected by a multiplicity of links. The system identifies multiple constraints for connection paths through the network, between source and destination nodes; establishes connection paths through the network between selected source and destination nodes, the established connection paths satisfying the constraints; for each established connection path, determines whether other connection paths exist between the selected source and destination nodes, and that satisfy the constraints; and if at least one such other connection path exists, determines whether any such other connection path is more efficient than the established connection path and, if the answer is affirmative, switches the connection from the established connection path to the most efficient other connection path.

BRIEF DESCRIPTION OF THE DRAWINGS

The invention will be better understood from the following description of preferred embodiments together with reference to the accompanying drawings, in which.

NOTE: In all figures depicting flow charts a loop control circle is used to represent iterating at a high level. For example in FIG. 1, the circle 106 "For each constraint" is used to indicate that all constraints are traversed or iterated over. The lines connected to/from the loop control circle surround the set of blocks representing operations that are repeated in each iteration, which are blocks 107 and 108 in the case of circle 106.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

In the following embodiments, the establishment of the paths for the Ethernet connections is executed using an offline provisioning system (referred to herein as a Value Management System or VMS). The system can set up paths using any networking technology, such as MPLS, GRE, L2TP or pseudowires. The VMS provides all the benefits of an offline provisioning system, but it also understands business rules and it is kept constantly in synch with the network. The VMS is optimized to be used with connection oriented switching devices, such as the WiMAX switch described above, which implements simple low-cost switching without requiring complex dynamic routing and signaling protocols.

Figure 1:
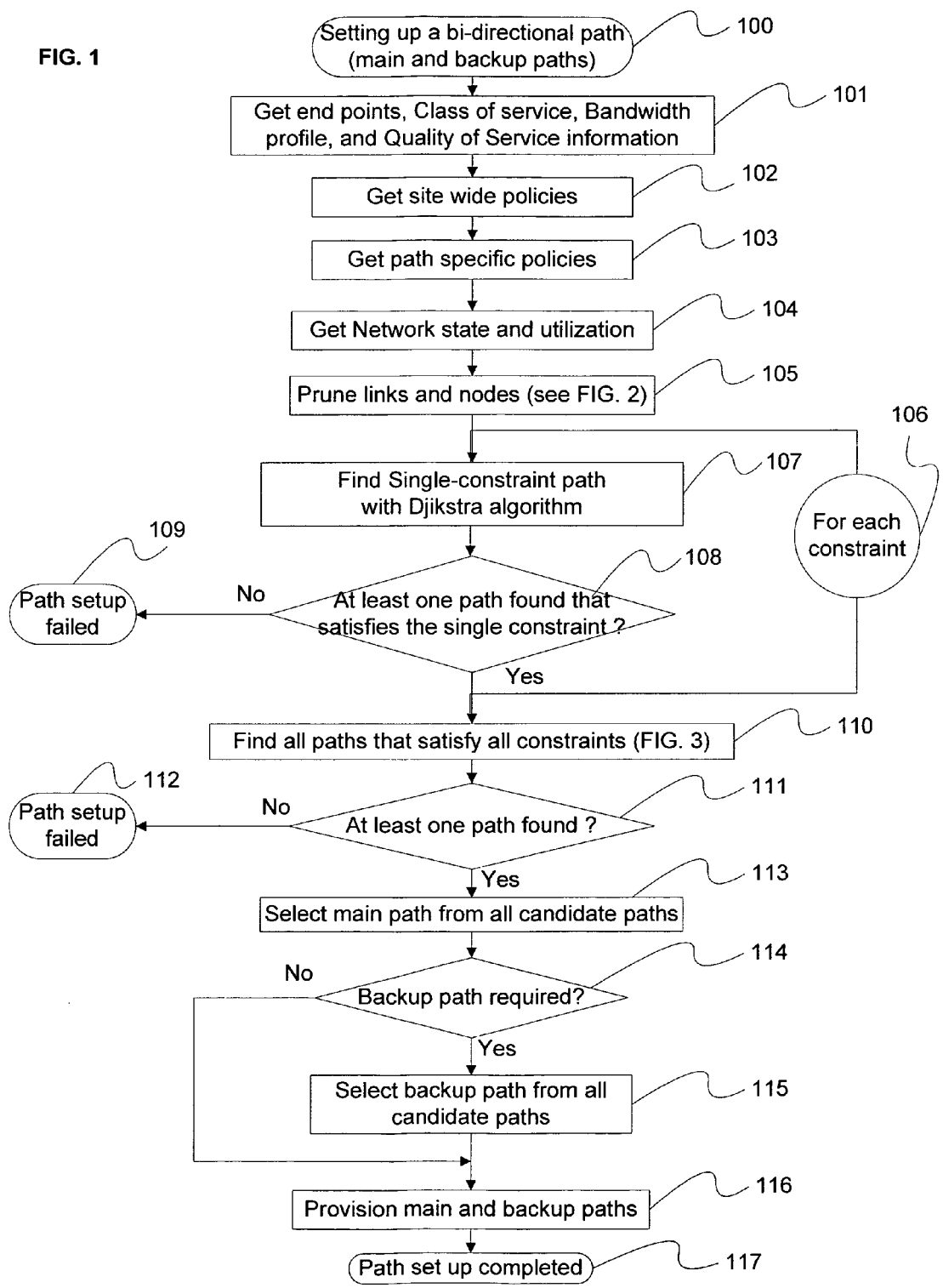
FIG. 1 illustrates one implementation of the path selection algorithm

Turning now to the drawings and referring first to FIG. 1, one implementation of a path selection algorithm is depicted. The goal is to set up a main and optional backup paths 100. At step 101, a main path and an optional backup path are requested for a designated pair of end points (the source and the destination). These paths must satisfy designated customer requirements or SLA, including: a selected Class of Service (CoS), Bandwidth Profile (CIR, CBS, EIR, EBS), and QoS parameters (e.g., Delay, Delay Jitter, Loss Ratio, Availability). The objective is to find a path that meets the subscriber's requirements and optimizes the provider's concerns.

In other words, the goal of the algorithm is to find a path that allows the provider to satisfy the subscriber's requirements in the most efficient way. The most efficient path (from the provider's point of view) is the one that optimizes a combination of selected provider criteria such as cost, resource utilization or load balancing.

The operator typically selects from various templates for CoS, QoS and Bandwidth Profile. If required, some values may be modified from the default values in the templates to account for specific subscriber requirements.

Step 102 retrieves site-wide policies that capture non-path specific rules that the provider specifies for the entire network. These policies reflect the provider's concerns or priorities, such as:

The relative priority of optimizing criteria such as load balancing, resource utilization, cost minimization
  Strict requirements such as Rules for including/excluding nodes/links based on requested CoS, node/link attributes and utilization.
  Maximum cost per CoS (e.g.: Number of RF hops)

Figure 2:
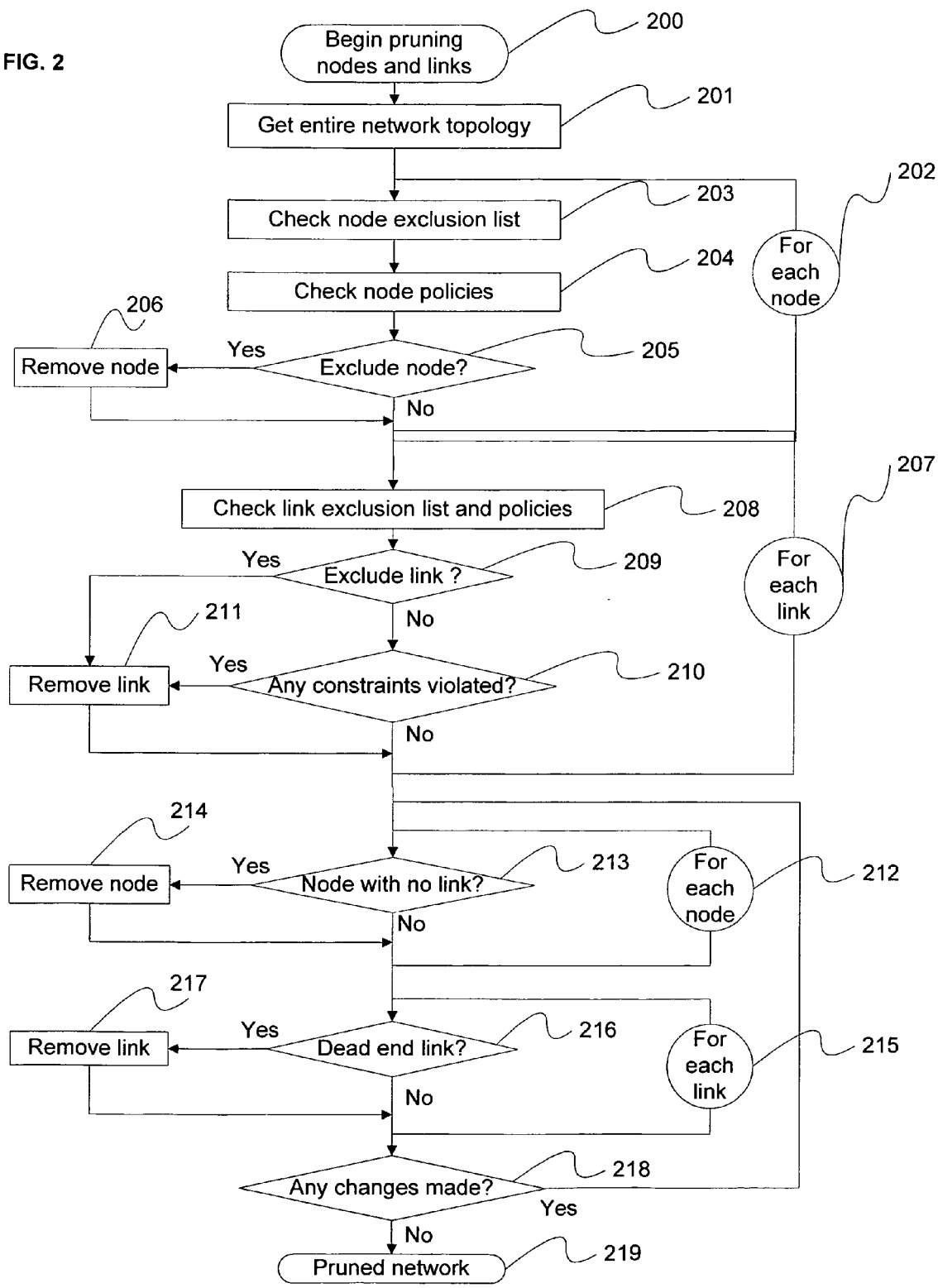
FIG. 2 illustrates one implementation of the network pruning algorithm

Step 103 retrieves path-specific policies which can override site-wide policies for the particular path being requested. For example:

Change relative priority of optimizing criteria such as load balancing, resource utilization, cost minimization
  Change strict requirements such as rules for including/ excluding nodes/links based on requested CoS, node/ link attributes and utilization
  Minimum/maximum packet size per link
  Maximum cost per CoS (e.g.: Number of RF hops)
  Explicit node/link inclusion/exclusion lists Step 104 retrieves network state and utilization parameters maintained by the VMS over time. The VMS discovers nodes and queries their resources, keeps track of reserved resources as it sets up paths through the network (utilization), and keeps in sync with the network by processing updates from nodes. The available information that can be considered when searching for paths includes:

Node discovery
    List of available resources
    Links to neighbouring nodes
  Node updates
    Links down
    RF links status and performance (actual capacity, loss ratio)
    Down or shrunk links can be (operator's choice)
      ignored for path computation (with optional warnings)
      avoided
  Utilization
    VMS keeps track of resource allocation (and availability) per node, per link, per CoS Step 105 prunes from the network invalid links and nodes-using a pruning sub-routine, such as one illustrated in FIG. 2 described below.

To ensure that there are at least some paths available in the network that satisfy each single constraint separately, step 107 takes each additive constraint (delay, jitter, loss, availability) separately and finds the path with the optimal value for that constraint using, for example, Dijsktra's algorithm. For example, if the smallest path delay is higher than the requested delay, step 108 determines that no path will be found to satisfy all constraints and sets a "Path setup failed" flag at step 109.

If one or more paths found optimizing one single constraint at a time satisfy all constraints, we know there are feasible paths→SUCCESS.
  If no path found satisfies all constraints→UNKNOWN, so use gathered data for heuristic functions in full multi-constraint algorithm.

The algorithm finds paths that optimize one constraint at a time. For each constraint, the steps within a control loop 106 are executed. This step is a "sanity check", because it will fail immediately if no paths are found that satisfy any constraint 108, avoiding the expensive multiple-constraint search which is bound to fail. If the answer is negative, the algorithm is terminated immediately. If the answer is positive, the loop is completed for that particular constraint. As indicated by the control loop 106, the steps 107-108 are repeated for each existing constraint.

The results of the single-constraint optimal paths can be saved for later use. The algorithm can also gather information about nodes and links by performing a linear traversal of nodes/links to compute for example minimum, maximum and average values for each constraint.

The previously collected information (best single-constraint paths and node/link information) can be used during the full multiple-constraint search to improve and speed up decisions if there is not enough time to perform an exhaustive search (e.g.: when to stop exploring a branch and move on to a different one). See SCALABLE PATH SEARCH ALGORITHM below.

Figure 3:
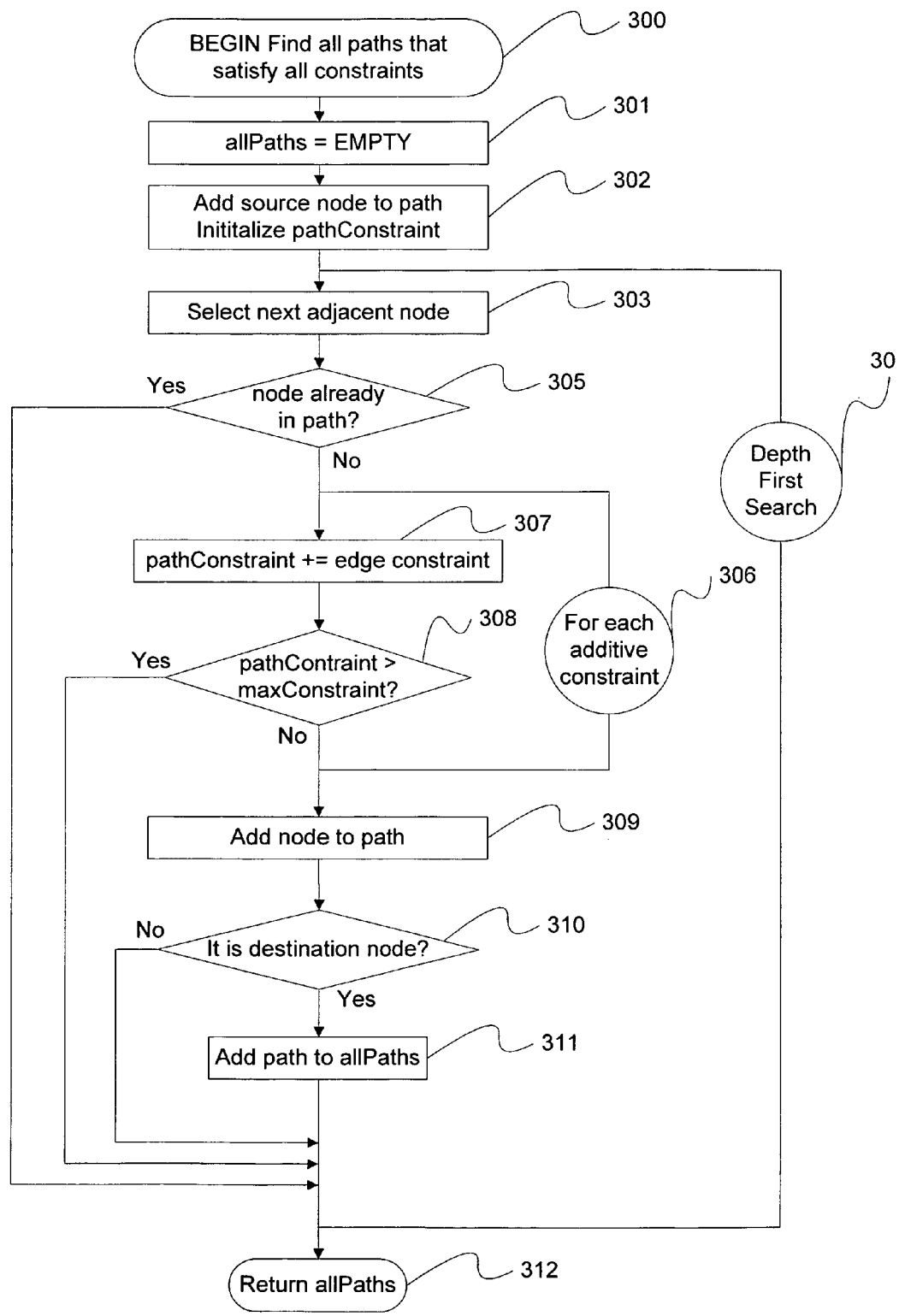
FIG. 3 illustrates one implementation of the path searching based on multiple constraints.

Once it is determined that there are possible optimal paths that could satisfy all constraints, the multi-constraint search algorithm FIG. 3 is performed 110, as described below. If no path is found that satisfies all subscriber's requirements, the path setup failed 112.

If at least one candidate path has been found, a main path is selected 113 from the list of candidate paths. Any provider-specific policies such as cost, load-balancing, resource utilization can be taken into account to select the most efficient path from the list.

If a backup path is required 114, it is selected from the list of candidate paths. When selecting the backup path 115, the system will select the path that is most distinct from the main path and that also optimizes the carrier-specific policies.

Once both the main and backup paths have been selected they can be provisioned 116 (they are set up in the nodes), and the path setup is completed 117.

FIG. 2 illustrates one implementation of the function used to prune the links and nodes from the network prior to search for the paths 200. The algorithm starts with the entire network topology 201, excludes node/links based on explicit exclusion lists, or exclusion rules.

For each node in the network the steps within a control loop 202 are executed. The node exclusion list 203 and the node exclusion policies 204 are consulted. If the node is to be excluded 205, it is removed 206 from the set of nodes to be considered during the path search. As indicated by the control loop 202, the steps 203-206 are repeated for each node in the network.

For each link in the network the steps within a control loop 207 are executed The link exclusion list and exclusion policies 208 are consulted. If the link is to be excluded 209, or violates non-additive or additive constraints 210, it is removed 211 from the set of links to be considered during the path search. An example of a link violating a non-additive constraint is when its bandwidth is smaller than the requested path bandwidth. An example of a link violating an additive constraint is when its delay is longer than the total delay requested for the entire path. As indicated by the control loop 207, the steps 208-211 are repeated for each link in the network The links are pruned recursively and then nodes with no incoming or outgoing links are pruned. For each node still remaining the steps within a control loop 212 are executed. If there are no links 213 reaching the node, it is removed 214. As indicated by the control loop 212, the steps 213-214 are repeated for each node in the network.

Then for each link still remaining the steps within a control loop 215 are executed. If it does not reach any node 216, it is removed 217. As indicated by the control loop 215, the steps 216-217 are repeated for each link in the network.

The steps 212-217 are repeated while at least a node or link has been removed 218.

The pruning takes into account that the paths are bi-directional and they need to go through the same links in both directions. Once complete 219, the remaining set of nodes and links is a subset of the entire network that is used as input into the path search algorithm.

FIG. 3 illustrates one example of a search algorithm that finds all paths satisfying a set of constraints 300. The algorithm sees the network as a graph of nodes (vertices) connected by links (edges). A possible path is a sequence of links from the source node to the destination node such that all specified constraints are met. For each path selected, additive constraints are added 307 to ensure they do not exceed the requirements. When setting up bi-directional paths, the algorithm checks both directions of the path to ensure that the constraints are met in both directions.

The algorithm starts by initializing the list of all candidate paths 301, and the first path to explore starting at the source node 302. The algorithm traverses the network graph depth first 304 looking at each potential end-to-end path from source to destination considering all constraints simultaneously in both directions. Other graph traversing techniques, such as breadth first, could also be used. The steps within the depth first search control loop 304 are executed. One of the adjacent nodes is selected 303 to explore a possible path to the destination. If the node is not yet in the path 305, for each additive constraint the steps within a control loop 306 are executed. The path total for that constraint is updated 307 by adding the value of that constraint for the link to the node being considered. If any of the constraints for the entire path is violated 308, the node being considered is not added to the path. As indicated by the control loop 306, the steps 307-308 are repeated for each additive constraint. If all constraints for the path are satisfied the node is added to the path 309 and one of its adjacent nodes will be considered next 304 & 305. If the node just added happens to be the destination node 310, the path is a candidate, so it is added to the list of all candidate paths 311. As indicated by the control loop 304, the steps 305-311 are repeated all nodes are traversed depth first.

Every time a successful path to destination is found, or a branch is discarded because a constraint is violated or because the destination node cannot be reached, the algorithm backtracks to the last node with adjacent nodes not yet explored 304, thus following a depth first traversal order. Once the whole graph representing the relevant subset of the network has been explored, the set of all candidate paths is returned 312.

As the size of the network increases, the time required to explore all possible paths grows exponentially, so finding all candidate paths and then picking the best according to some criteria becomes impractical.

If a maximum time is allocated to the path search, some heuristics are needed to pick which links to explore first. This may improve the chances of having a good selection of candidate paths to select from when the search time is up.

Figure 4:
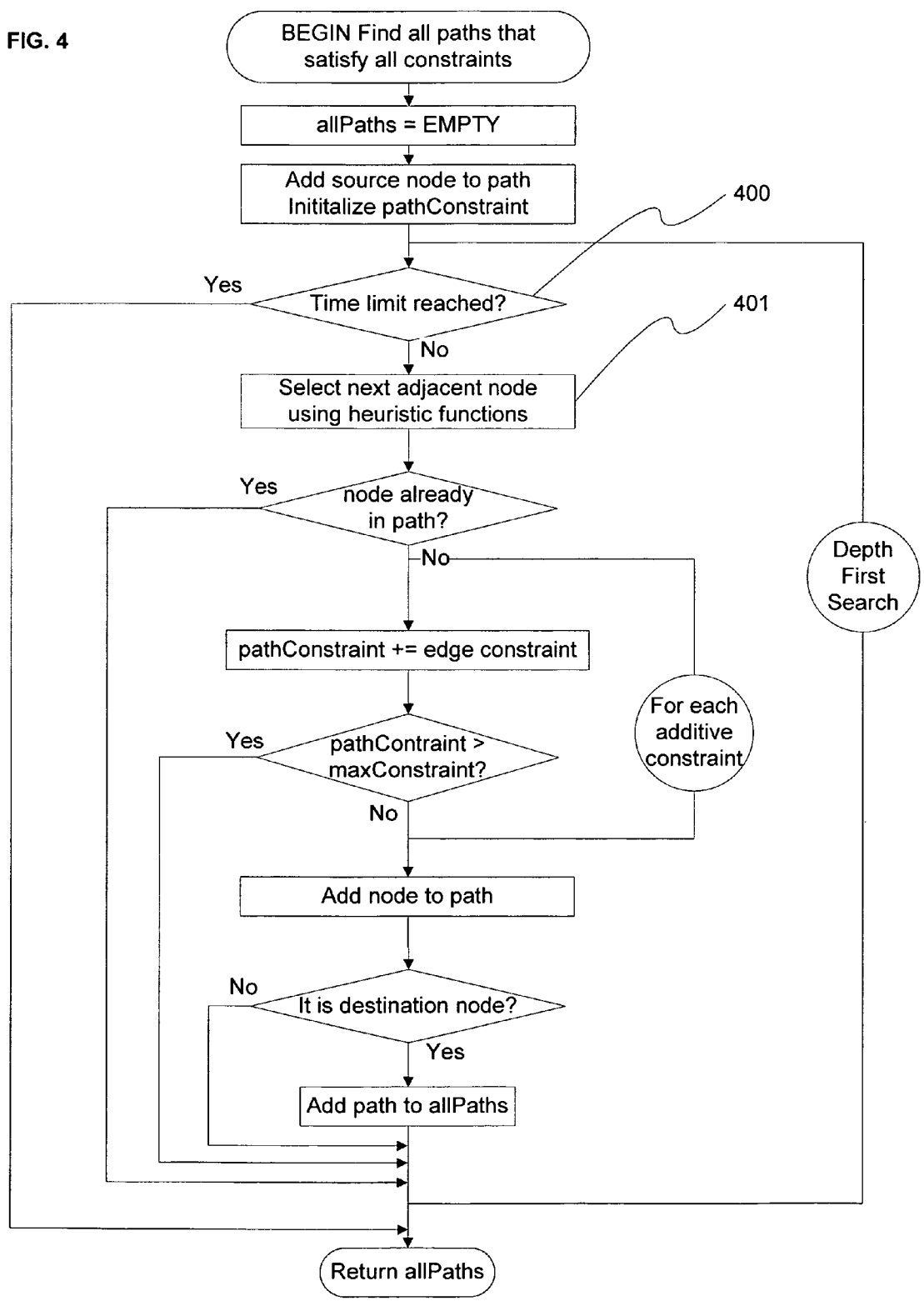
FIG. 4 illustrates one implementation of the path searching based on multiple constraints using heuristics.

The standard depth first graph traversal goes through links in a fixed arbitrary order. A "sort function" can be plugged into the depth first search graph to decide which link from the current node to explore next (FIG. 4). The algorithm shown in FIG. 4 is based on the algorithm shown in FIG. 3 described above, with only two differences to highlight:

A new check is added to ensure the algorithm does not go over a specified time limit 400.

A sort function 401 is used to choose in which order adjacent nodes are explored 401. The sort function 401 can range from simple random order, which might improve load balancing over time, all the way to a complex composite of multiple heuristic functions with processing order and relative weight dynamically adjusted based on past use and success rate.

A heuristic function could for example look at the geographical location of nodes in order to explore first links that point in the direction of the destination. Also heuristic functions can make use of the information gathered while running single-constraint searches using Dijkstra's algorithm, or by traversing the nodes and links and computing minimum, maximum and average values for various parameters. Another heuristic function could take into account performance stats collected over time to improve the chances of selecting a more reliable path. There are infinite heuristic functions that can be used, and the network wide view is available to the VMS to improve the chances of making better decisions along the path search. A practical limitation is that the sorting time should be much shorter than the path exploration time. To that effect some data may be consolidated over time by the VMS so it is pre-computed and efficient to look up and use.

This mechanism allows the use of any combination of heuristics making use of collected and consolidated information and policies in order to handle network scalability.

Two passes of the multiple-constraint path search may be needed when looking for main and backup paths in a very large network. Even if the provider's criteria to optimize both main and backup paths are identical, there is one crucial difference: to achieve effective protection, the backup path must be as distinct from the main path as possible, overriding all other concerns. Since not all paths can be examined (time limit), choosing which ones to explore first is important. When looking for candidates for backup path the main path must already be known, so being distinct from it can be used as a selection criterion. This means that the first pass results in a list of candidates from which the main path is selected, and the second pass results in a list of candidate paths from which the backup path is selected, as distinct as possible from the main path.

When a new service (end-to-end connection) is requested, the VMS runs through its path search algorithm to find candidate paths that satisfy the subscriber's requirements. Then it selects from those candidate paths the main and backup paths that optimize the provider's goals such as cost and load balancing. This selection makes use of business policies and data available at the time a new service is requested, as reflected by the constraints used in the algorithms described above in connection with the flow charts in FIGS. 1-3. Those constraints are modified from time to time as the provider's policies change. Over time, more paths are requested, some paths are torn down, the network evolves (nodes and links may be added or removed), and the provider's concerns may change. The paths that remain active still satisfy the original subscriber's requirements, but the network resources may be not optimally utilized in the new context, i.e., new paths may exist that are more efficient under the current constraints established to reflect the provider's policies.

To optimize utilization of the network resources at any point in time, the VMS runs the same path search algorithm to find the optimal paths that would be allocated at the present time to satisfy existing services (end-to-end connections). Using the same sorting mechanisms that drive the selection of the optimal paths from the candidate list, the VMS compares the currently provisioned paths with the new ones found. If the new paths are substantially better, the VMS suggests that those services be re-implemented with the new paths. The provider can then select which services to re-implement.

Figure 5:
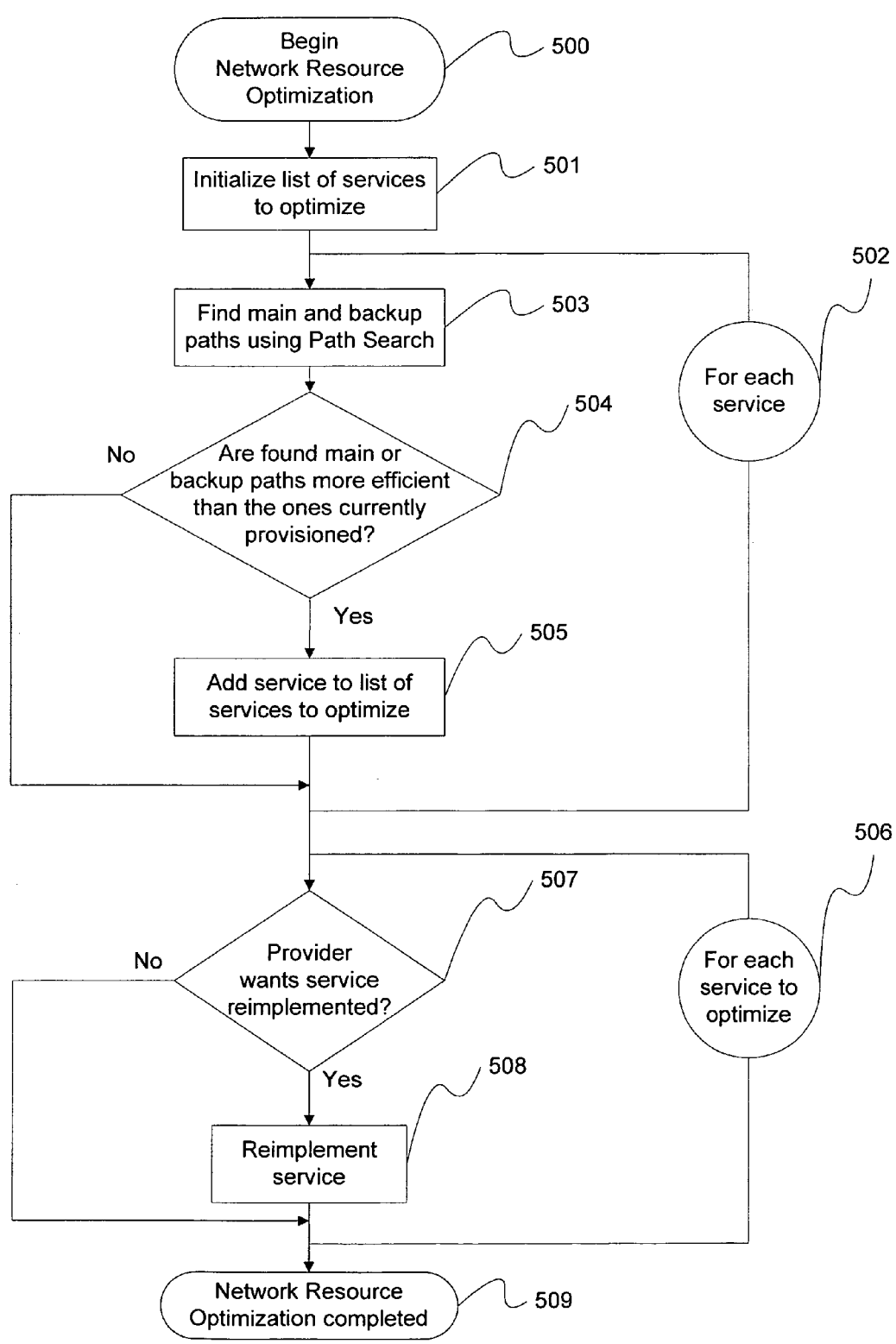
FIG. 5 illustrates one implementation of a network resource optimization algorithm.

One example of an algorithm for optimizing utilization of the network resources is illustrated by the flow chart in FIG. 5. The algorithm starts at step 501 with an empty list of services to optimize. For each existing service, the steps within a control loop 502 are executed. First, a new set of main and backup paths is found at step 503, using the same path search algorithm described above in connection with FIG. 3. Although the subscriber's requirements have not changed, the paths found this time may be different from the paths found when the service was originally requested, because network utilization and the provider's concerns may be different. Step 504 then determines whether the new paths are more efficient than the ones currently provisioned 504. If the answer is affirmative, the service is added to the list of services worth optimizing at step 505. If the answer is negative, the loop is completed for that particular service. As indicated by the control loop 502, the steps 503-506 are repeated for each existing service.

Once the list of services to optimize is completed, a report is presented to the provider that summarizes the benefits to be gained by rerouting those services. For each service proposed to be optimized 506, the steps within a control loop 506 are executed. Step 507 determines whether the provider wants the service to be re-implemented by the new found paths. If the answer is affirmative, the service is re-routed at step 508. If the answer is negative, the loop is completed for that particular service. As indicated by the control loop 506, the steps 507 and 508 are repeated for each of the services on the list generated at step 505, and then the algorithm is completed at step 509.

For example: Consider the best effort, least paying activated services. There may be a currently existing path now that satisfies the service more efficiently than the currently provisioned path, from the point of view of the provider's current policies such as cost or load balancing. Thus, running the path search algorithm with the same service specification may result in a more efficient way of providing that service. A switchover can then be scheduled to minimize service interruption, if necessary.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of selecting connection paths, in a network having a multiplicity of nodes interconnected by a multiplicity of links, comprising
  establishing multiple connection paths in a centralized offline provisioning system maintained in synchronism with said network,
  excluding nodes based on a node exclusion list and node exclusion policies,
  excluding links based on a link exclusion list and link exclusion policies related to one or more of non-additive and additive constraints,
  identifying multiple constraints for connection paths through said network, between source nodes and destination nodes,
  identifying at least one connection path that satisfies each of said constraints individually for a connection path between a selected source node and a selected destination node, wherein the at least one connection path is identified based on a plurality of statistical heuristics that narrow candidate connection paths between the selected source node and the selected destination node, and
  if at least one connection path is found that satisfies each of said constraints individually for all of said constraints, identifying connection paths that satisfy all of said constraints for a connection path between the selected source node and the selected destination node,
  wherein single-constraint statistical heuristic connection path analyses are saved and used as part of subsequent multiple-constraint statistical heuristic connection path analyses, and
  wherein the network is an Ethernet network.

2. The method of claim 1 wherein said identifying step includes
  selecting a node adjacent to said source node,
  determining whether the inclusion of a link from said source node to said adjacent node, in a potential path from said source node to said destination node, violates any of said constraints,
  adding to said potential path said link from said source node to said adjacent node, if all of said constraints are satisfied with that link added to said potential path, and
  iterating said selecting, determining and adding steps for a node adjacent to the downstream node of each successive added link, until a link to said destination node has been added.

3. The method of claim 2 which includes limiting said identifying step to a prescribed time limit, and selecting each of said adjacent nodes according to a sorting function.

4. The method of claim 1 in which said constraints include network operator-specified business rules relating to at least one factor selected from the group consisting of cost minimization, resource utilization, load balancing, packet size, rules for including and excluding nodes and links based on the requested class of service, node and link attributes and utilization, and maximum cost for the class of service.

5. The method of claim 1 in which said constraints include at least one subscriber-specified requirement selected from the group consisting of class of service, bandwidth profile, quality-of-service parameters, node/link attributes and utilization, minimum/maximum packet size per link, maximum cost for the requested class of service, and explicit node and link inclusion and exclusion lists.

6. The method of claim 1 which includes identifying multiple paths that satisfy all of said constraints for a connection path between said selected source and destination nodes, and selecting from said multiple paths both a main path and a backup connection path between said selected source and destination nodes.

7. The method of claim 6 in which said connection paths are bidirectional.

8. The method of claim 1 which includes
  selecting a node adjacent to said selected source node according to a sorting function,
  determining whether the inclusion of a link from said source node to said adjacent node, in a potential path from said source node to said destination node, violates any of said constraints,
  adding to said potential path said link from said source node to said adjacent node, if all of said constraints are satisfied with that link added to said potential path, iterating said selecting, determining and adding steps for a node adjacent to the downstream node of each successive added link, until a link to said destination node has been added, and limiting said selecting, determining and adding steps to a prescribed time limit.

9. The method of claim 1, further comprising:

finding single-constraint paths of the connection paths based on each of said multiple constraints; and storing data related to each of said found single-constraint paths of the connection paths based on each of said multiple constraints.

10. The method of claim 9, wherein the plurality of heuristics comprise any of geographical location, the stored data, and performance statistics.

11. A method of selecting connection paths, in a network having a multiplicity of nodes interconnected by a multiplicity of links, comprising excluding nodes based on a node exclusion list and node exclusion policies, excluding links based on a link exclusion list and link exclusion policies related to one or more of non-additive and additive constraints, identifying multiple constraints for connection paths through said network, between source nodes and destination nodes, identifying at least one connection path that satisfies each of said constraints individually for a connection path between a selected source node and a selected destination node, wherein the at least one connection path is identified based on a plurality of statistical heuristics that narrow candidate connection paths between the selected source node and the selected destination node, and if at least one connection path is found that satisfies each of said constraints individually for all of said constraints, identifying connection paths that satisfy all of said constraints for a connection path between the selected source node and the selected destination node, wherein said identifying step includes selecting a node adjacent to said source node according to a sorting function, determining whether the inclusion of a link from said source node to said adjacent node, in a potential path from said source node to said destination node, violates any of said constraints, adding to said potential path said link from said source node to said adjacent node, if all of said constraints are satisfied with that link added to said potential path, iterating said selecting, determining and adding steps for a node adjacent to the downstream node of each successive added link, until a link to said destination node has been added, and limiting said selecting, determining and adding steps to a prescribed time limit, wherein single-constraint statistical heuristic connection path analyses are saved and used as part of subsequent multiple-constraint statistical heuristic connection path analyses, and wherein the network is an Ethernet network.

12. A method of optimizing utilization of the resources of a network having a multiplicity of nodes interconnected by a multiplicity of links, comprising establishing multiple connection paths in a centralized offline provisioning system maintained in synchronism with said network, excluding nodes based on a node exclusion list and node exclusion policies, excluding links based on a link exclusion list and link exclusion policies related to one or more of non-additive and additive constraints, identifying multiple constraints for connection paths through said network, between source nodes and destination nodes, identifying at least one connection path that satisfies each of said constraints individually for a connection path between a selected source node and a selected destination node, wherein the at least one connection path is identified based on a plurality of statistical heuristics that narrow candidate connection paths between the selected source node and the selected destination node, if at least one path is found that satisfies each of said constraints individually for all of said constraints, identifying connection paths that satisfy all of said constraints for a connection path between the selected source node and the selected destination node, establishing connection paths through said network between selected source nodes and destination nodes, said established connection paths satisfying said constraints, for each established connection path, determining whether other connection paths exist between said selected source nodes and destination nodes, and that satisfy said constraints, if at least one such other connection path exists, determining whether any such other connection path is more efficient than the established connection path and, if the answer is affirmative, switching the connection from said established connection path to the most efficient other connection path, wherein single-constraint statistical heuristic connection path analyses are saved and used as part of subsequent multiple-constraint statistical heuristic connection path analyses, and wherein the network is an Ethernet network.

13. The method of claim 12 wherein said determining and switching are executed periodically in the background.

14. The method of claim 12 wherein said determining and switching are executed in response to a manual input.

15. A network management system managing a network having a multiplicity of nodes interconnected by a multiplicity of links, comprising a centralized offline provisioning system maintained in synchronism with said network, for establishing multiple connection paths, a database containing a node exclusion list and node exclusion policies for excluding nodes, a database containing a link exclusion list and link exclusion policies related to one or more of non-additive and additive constraints for excluding links, a database containing multiple constraints for connection paths through said network, between source nodes and destination nodes, and a processor programmed to identify connection paths that satisfy all of said constraints for a connection path between a selected source node and a selected destination node, wherein the processor is programmed to identify at least one connection path that satisfies each of said constraints individually for a connection path between a selected source node and a selected destination node, wherein the at least one connection path is identified based on a plurality of statistical heuristics that narrow candidate connection paths between the selected source node and the selected destination node, and if at least one path is found that satisfies each of said constraints individually for all of said constraints, identify connection paths that satisfy all of said constraints for a connection path between the selected source node and the selected destination node, wherein single-constraint statistical heuristic connection path analyses are saved and used as part of subsequent multiple-constraint statistical heuristic connection path analyses, wherein the network is an Ethernet network.

16. The system of claim 15 in which said constraints include network operator-specified business rules relating to at least one factor selected from the group consisting of cost, resource utilization, and load balancing.

17. The system of claim 15 in which said constraints include at least one subscriber-specified requirement selected from the group consisting of class of service, bandwidth profile, and quality-of-service parameters.

18. The system of claim 15 in which said paths between each pair of source and destination nodes include both a main path and a backup connection path.

19. A scalable method of selecting a connection path from a source node to a destination node in a network having a multiplicity of nodes interconnected by a multiplicity of links, comprising establishing multiple connection paths in a centralized offline provisioning system maintained in synchronism with said network, excluding nodes based on a node exclusion list and node exclusion policies, excluding links based on a link exclusion list and link exclusion policies related to one or more of non-additive and additive constraints, identifying multiple constraints to be satisfied by said connection path through said network, between said source nodes and destination nodes, identifying at least one connection path that satisfies each of said constraints individually for a connection path between a selected source node and a selected destination node, wherein the at least one connection path is identified based on a plurality of statistical heuristics that narrow candidate connection paths between the selected source node and the selected destination node, and if at least one path is found that satisfies each of said constraints individually for all of said constraints, identifying connection paths that satisfy all of said constraints for a connection path between the selected source node and the selected destination node, for each said constraint, pre-computing a single metric that optimizes said constraint for paths from each node of said network to said destination node, creating a list of all potential paths between said source and destination nodes, for each of said potential paths,
  computing the value of said single metric for the portion of said path between said source node and an intermediate node in said path, and then combining that computed value with said pre-computed value for said metric for the portion of said path between said intermediate node and said destination node,
  determining whether the resulting total value violates said constraint for said metric and
    if the answer is affirmative, removing said path from said list of potential paths between said source and destination nodes,
    if the answer is negative, repeating said computing and determining steps for another intermediate node in said path, and selecting a connection path for use, from among the potential paths remaining in said list, to optimize policies, wherein single-constraint statistical heuristic connection path analyses are saved and used as part of subsequent multiple-constraint statistical heuristic connection path analyses, and wherein the network is an Ethernet network.

20. The method of claim 19 in which said computing and determining steps are repeated for multiple potential paths in said list until the expiration of a predetermined time period.

21. The method of claim 19 in which said computing and determining steps are repeated for each of said potential paths in said list.

22. The method of claim 19 in which said computing and determining steps are executed first for the node adjacent said source node in each said path, and then for successive nodes between said first node and said destination node.

* * * * *